US008192616B2

(12) United States Patent
Chaffin

(10) Patent No.: US 8,192,616 B2
(45) Date of Patent: *Jun. 5, 2012

(54) PRESSURIZED WASTEWATER EFFLUENT CHLORINATION SYSTEM

(76) Inventor: Mark N. Chaffin, Wallis, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/032,533

(22) Filed: Feb. 22, 2011

(65) Prior Publication Data

US 2011/0139691 A1 Jun. 16, 2011

Related U.S. Application Data

(63) Continuation of application No. 11/891,166, filed on Aug. 9, 2007, now Pat. No. 7,892,422.

(60) Provisional application No. 60/837,464, filed on Aug. 11, 2006.

(51) Int. Cl.
*B01D 17/12* (2006.01)

(52) U.S. Cl. ...................... 210/121; 210/143; 210/198.1; 210/205; 210/754; 422/261; 137/268; 137/395; 137/571; 137/572

(58) Field of Classification Search .................... 210/97, 210/121, 123, 134, 137–139, 143, 151, 198.1, 210/202–205, 220, 221, 754, 756, 136, 206, 210/221.1, 222.2, 21, 521, 538; 137/386, 137/395–398, 268, 571, 572; 422/264, 278, 422/281, 261

See application file for complete search history.

(56) References Cited

U.S. PATENT DOCUMENTS

| 3,056,742 | A  | * | 10/1962 | Beaumont | 210/621 |
|3,133,877|A|*|5/1964|Mixer et al.|210/754|
|3,327,855|A|*|6/1967|Watson et al.|210/108|
|3,490,482|A|*|1/1970|Sachs et al.|137/205|
|3,497,064|A|*|2/1970|Valdespino|210/117|
|3,819,054|A|*|6/1974|Long et al.|210/195.3|
|4,351,722|A|*|9/1982|Mixon|210/195.3|
|4,839,273|A|*|6/1989|Yamada et al.|430/634|
|6,224,752|B1|*|5/2001|Drewery|210/86|
|6,627,071|B1|*|9/2003|Braden|210/121|
|6,932,912|B2|*|8/2005|Chaffin|210/754|
|7,314,546|B2|*|1/2008|McKinney|210/85|
|7,892,422|B2|*|2/2011|Chaffin|210/121|
|2003/0155311|A1|*|8/2003|Chaffin|210/754|

* cited by examiner

*Primary Examiner* — Joseph Drodge
(74) *Attorney, Agent, or Firm* — Douglas W. Rommelmann; Andrews Kurth LLP

(57) ABSTRACT

A pressurized wastewater effluent chlorination system including a treatment tank defining a contact chamber and an aeration chamber. The treatment tank receives wastewater effluent. The system includes a pressure vessel within a liquid chlorine storage container positioned in or near the treatment tank. Preferably, the pressure vessel is a floating vessel having a check valve at its bottom, enabling the vessel to fill with a predetermined amount or measured charge of chlorine depending on the position of a float on the vessel. In response to a timer control or float switch, a valve operates to communicate air pressure from a compressor to the vessel to displace the measured charge of liquid chlorine into the wastewater effluent in the contact chamber. Effluent flow and air discharge into the contact chamber enhances mixing of the chlorine and the effluent.

8 Claims, 1 Drawing Sheet

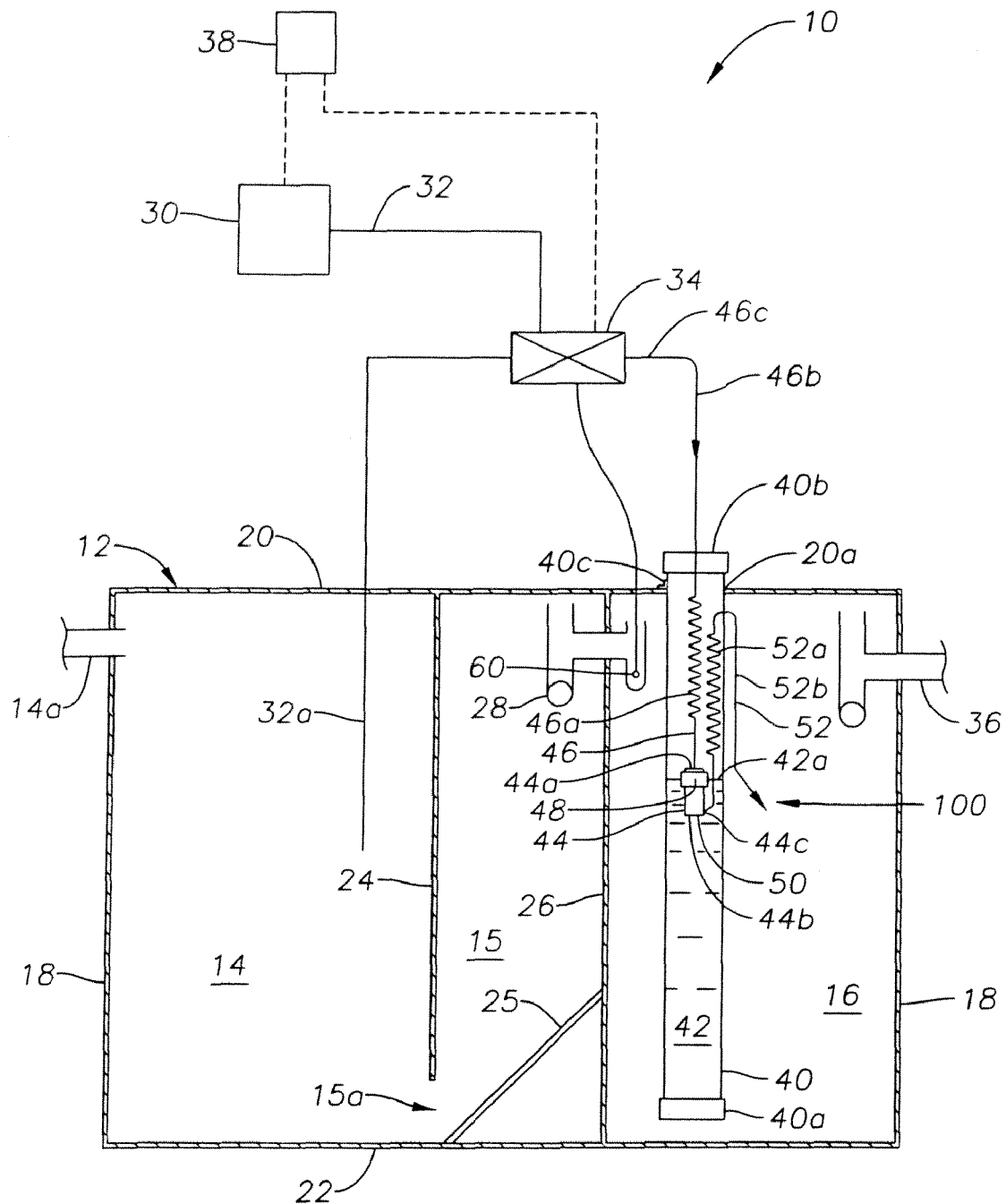

_US 8,192,616 B2_

PRESSURIZED WASTEWATER EFFLUENT CHLORINATION SYSTEM

CROSS-REFERENCE TO RELATED APPLICATIONS

This application is a continuation of U.S. application Ser. No. 11/891,166, filed Aug. 9, 2007, issued as U.S. Pat. No. 7,892,422 on Feb. 22, 2011, which application claims priority from U.S. Provisional Application Ser. No. 60/837,464, filed Aug. 11, 2006. Applicant incorporates by reference herein U.S. Provisional Application Ser. No. 60/837,464 in its entirety.

BACKGROUND OF THE INVENTION

1. Field of the Invention

The present invention relates generally to aerobic-type septic treatment systems for the purpose of disinfecting treated effluent. More specifically, the present invention addresses disinfecting the treated wastewater effluent by means of injecting liquid chlorine into the wastewater of a contact/pump chamber via forced air through a pressure vessel at predetermined intervals by means of a timing mechanism or on "demand" by using a float switch, either of which shall control an irrigation type valve which in turn allows air from a compressor or blower of the invention to force liquid chlorine solution from chlorine storage container via a conduit, such as vinyl tubing, into the clarified effluent of the contact/pump chamber.

2. Description of the Related Art

Aerobic wastewater systems and contact/pump chambers are currently used for handling the wastewater effluent of typical residences and small scale commercial establishments. For purposes of the present invention, the term "residential system" or "residential septic system" is intended to encompass any small volume septic system where effluent is treated and ultimately discharged by means of gravity flow, drip emitter or spray irrigation out of the contact/pump chamber. A small volume septic system is typically approximately 5,000 gallons per day (GPD) or less.

A typical aerobic system incorporates a series of components such as a control panel, an air compressor and timer, as well as a series of settling and mixing chambers for purposes necessary to the aerobic process.

SUMMARY OF THE INVENTION

The pressurized wastewater effluent chlorination system of the preferred embodiment of the present invention includes a chlorine storage container located within a contact chamber of an effluent treatment tank, a pressure vessel within the chlorine storage container, and a compressor providing compressed air to the pressure vessel to facilitate the discharge of a predetermined volume of chlorine from the pressure vessel into the wastewater effluent in the contact chamber.

Preferably, the system is an aerobic-type wastewater effluent treatment system in which the contact chamber facilitates contact of the wastewater effluent with chlorine and air for disinfecting treatment. Preferably, the sewage effluent treatment tank defines the contact chamber and an aeration chamber and is adapted to receive wastewater effluent. The liquid chlorine storage container is in or near the effluent treatment tank. The pressure vessel is preferably a floating pressure vessel located within the chlorine storage container and has a check valve at or near its bottom, enabling the floating pressure vessel to fill with a measured charge of chlorine. Preferably, the filling ceases when a float on the vessel stops its descent into the liquid chlorine. In response to a timer control, a valve operates to communicate air pressure from a compressor to the floating pressure vessel to displace the measured charge of liquid chlorine into the contact chamber. Effluent flow and air discharge into the contact chamber enhances mixing of the chlorine and the effluent.

BRIEF DESCRIPTION OF THE SEVERAL VIEWS OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawing, which drawing is incorporated as a part hereof. It is to be noted however, that the appended drawing illustrates only a preferred embodiment of the invention and is therefore not to be considered limiting of its scope, for the invention may admit to other equally effective embodiments.

In the drawings:

FIG. 1 is a schematic illustration of a preferred embodiment of the wastewater effluent treatment system of the present invention having a pressurized liquid chlorination system including a chlorine storage container located within a contact chamber of an effluent treatment tank, a pressure vessel within the chlorine storage container, and a compressor providing compressed air to the pressure vessel to facilitate the discharge of a predetermined volume of chlorine charged in the pressure vessel into the wastewater effluent in the contact chamber.

DETAILED DESCRIPTION OF PREFERRED EMBODIMENT

Referring to FIG. 1, a pressurized wastewater effluent chlorination system according to a preferred embodiment of the present invention, generally referred to as 10, is schematically illustrated. Preferably, the system 10 includes an effluent treatment tank 12 comprising an aeration chamber 14, a clarifier chamber 15, and a contact chamber 16. The effluent treatment tank 12 is preferably a walled enclosure having side walls 18, a top wall 20, and a bottom wall 22. The top wall 20 preferably includes at least one access opening 20a to permit servicing of the effluent treatment tank 12 and the system 10. The access opening 20a is typically closed with a removable cover. Although not shown, the effluent treatment tank 12 is typically buried or substantially buried underground. The effluent treatment tank 12 may be composed of any of a number of suitable materials, including metal, concrete, polymer, hard rubber, fiberglass, and the like.

In the preferred embodiment, the treatment tank 12 is partitioned into the chambers 14, 15 and 16 by a first dividing wall 24 and a second dividing wall 26, respectively. Typically, the aeration chamber 14 of the effluent treatment tank 12 is supplied with pre-treated sewage effluent through an aeration chamber inlet 14a. Preferably, the aeration chamber 14 aerobically treats the wastewater effluent by introducing air from an aerator compressor 30 through an air supply conduit 32, an alternating or irrigation valve 34, and one or more air drop conduits 32a as shown in FIG. 1. The air from the air drop conduits 32a is preferably discharged into the wastewater effluent at or near a lower end of the aeration chamber 14 so that, as the air bubbles rise through the effluent, mixing of the oxygen with the effluent is enhanced. This allows aerobic bacteria and other microorganisms to attack and reduce the organic materials in the wastewater effluent into a new cell mass.

From the aeration chamber 14, the treated sewage effluent enters the clarifier chamber 15 through a lower passageway 15a. Preferably, the clarifier chamber 15 includes a slanted partition 25 sloping downwardly towards the lower passageway 15a. As the treated sewage effluent passes into and through the clarifier chamber 15, organic solids contained in the effluent settle and travel down the slanted partition 25 and back into the aeration chamber 14 for further treatment. As the solids settle out of the effluent in the clarifier chamber 15, the remaining effluent, containing primarily dissolved solids and bacteria, appears clear (or nearly clear) to the naked eye and discharges through an upper outlet pipe 28 into the contact chamber 16.

The contact chamber 16 preferably has a discharge outlet 36. The discharge outlet 36 is preferably lower than the outlet pipe 28 supplying effluent to the contact chamber 16. Since the discharge outlet 36 is below the outlet pipe 28, the effluent will not backflow from the contact chamber 16 to the clarifier chamber 15.

The system 10 includes a chlorinator 100 having a storage container 40 of liquid chlorine solution 42 preferably located in or substantially in the contact chamber 16 as shown in FIG. 1, or alternatively near or adjacent to the contact chamber 16. The storage container 40 is preferably made of pipe, preferably polyvinyl chloride (PVC) pipe. It is to be understood that the diameter and length of the storage container 40 may vary depending on the size and capacity of the system 10. Merely by way of example, if a 5 gallon storage container 40 was desired, it could be made from 12" diameter pipe about 1' long or from 4" diameter pipe about 8' long, just to identify a rev, of the numerous possibilities. Furthermore, the shape of the storage container 40 need not be cylindrical; rather, its configuration and shape may differ, particularly if it is located outside of the contact chamber 16.

The storage container 40 is preferably sealed with a bottom closure 40a at its lower end, which may be in the form of a conventional PVC pipe cap. The upper end of the storage container 40 is preferably provided with a removable closure member 40b to permit the chlorine storage container 40 to be filled with a suitable quantity of liquid chlorine solution 42 so that the chlorinator 100 will have a reasonable service life before needing to be refilled. For example, the chlorine solution storage container 40 may contain a sufficient quantity of liquid chlorine solution 42 to permit unattended operation of the chlorinator for a long period of time, preferably from 2 to 4 months, before the supply of chlorine solution 42 is substantially exhausted. Preferably. the upper end of the storage container 40 extends outside of the contact chamber 16 to facilitate access. Additionally, the storage container 40 is preferably either mounted to the removable cover in the access opening 20a or includes a fastener 40c for securing to the top wall 20 of the effluent treatment tank 12.

Placed inside the storage container 40 is a vessel 44, preferably a pressure vessel, to which a pressure line 46 is attached. Preferably, the pressure line 46 has a first end connected to an upper end wall 44a of the pressure vessel 44 and a second end connected to the irrigation valve 34. Preferably, the pressure line 46 includes a first pressure line portion 46a having an excess length within the chlorine storage container 40 and a second pressure line portion 46b exiting the container 40 and extending to the irrigation valve 34.

The pressure vessel 44 is preferably cylindrical in shape and has upper and lower end walls 44a and 44b, respectively. The pressure vessel 44 preferably includes an attached buoyancy ring 48 surrounding the vessel 44. The buoyancy ring 48 is composed of a buoyant material providing buoyancy to the pressure vessel 44 when it is charged with the chlorine solution 42 as described below. The buoyancy ring 48 is smaller in size than the internal cross-section of the storage container 40 to permit the floating pressure vessel 44 to freely move along the internal surface of the storage container 40. Preferably, the buoyancy ring 48 can be positioned at a plurality of locations along the length of the pressure vessel 44, as for example by having a sliding, friction fit with the pressure vessel 44, for reasons which will be explained below.

In the preferred embodiment of the invention, the floating vessel 44 includes a valve 50, preferably a check valve, located in or adjacent the lower end wall 44b of the pressure vessel 44. The check valve 50, when open, permits fluid communication of the chlorine solution 42 within the storage container 40 to the internal volume of the floating pressure vessel 44. Preferably, a vent allows air to escape from the internal volume of the floating pressure vessel 44 as the chlorine solution 42 "charges" or fills the pressure vessel 44. In the preferred embodiment, the vent 46c is a small hole through the wall of the pressure line 46 connected to the pressure vessel 44. Preferably, the vent 46c in the pressure line 46 is outside of the chlorine storage container 40 and open to the atmosphere.

The pressure vessel 44 is "charged" or filled with a predetermined volume of the chlorine solution 42 through the valve 50. In a preferred embodiment, the predetermined volume depends on the placement of the buoyancy ring 48 along the length of the pressure vessel 44. For example, placing the buoyancy ring 48 close to the upper end of the pressure vessel 44 permits more chlorine solution 42 to enter the pressure vessel 44 than when the buoyancy ring 48 is placed at the mid-portion of the pressure vessel's length due to the increased submerged length of the vessel 44. The pressure vessel 44, with the positioned buoyancy ring 48, continues to fill with the chlorine solution 42 until the solution level in the vessel 44 is the same or very nearly the same as the solution level 42a in the storage container 40. It is to be understood that the buoyancy ring 48 in the preferred embodiment provides positive buoyancy to the vessel 44 and ring 48 even when the vessel 44 is "charged."

Referring to the FIGURE, the pressure vessel 44 includes an outlet 44c, preferably in the lower portion of the pressure vessel 44. A discharge tube 52 has one end connected to the outlet 44c and a second end in the contact chamber 16 outside of the chlorine storage container 40. Preferably, the discharge tube 52 includes a first discharge tube portion 52a having an excess length within the chlorine storage container 40 and a second discharge tube portion 52b exiting the container 40 at an upper portion of the container 40 and running down along a portion of the length of the chlorine storage container 40.

In the preferred embodiment of the invention, after the floating pressure vessel 44 is charged, it remains floating at this level in the chlorine storage container 40. In the preferred embodiment, a timer mechanism 38, at pre-selected times, signals or controls the irrigation valve 34 to direct compressed air from the compressor 30 through the air supply conduit 32, the irrigation valve 34, the pressure line 46 and into the pressure vessel 44. This causes the check valve 50 of the pressure vessel 44 to close, pressurizing the floating pressure vessel 44 and forcing chlorine solution 42 out of the vessel 44 through the discharge tubing 52 into the contact chamber 16, where the chlorine solution 42 disinfects the effluent and the additional air from the compressor 30 helps to mix the chlorine solution 42 with the effluent as well as keep the contact chamber 16 from septic conditions by aid of aerating the contact chamber 16 while it mixes the chlorine 42.

The timer mechanism 38 may include a control panel with a timer. The timer mechanism 38 may also control the operation of the compressor 30. It is to be understood that, alternatively, a float switch 60 in the contact chamber 16 could be used to control the irrigation valve 34 instead of the timer mechanism 38.

In the illustrated preferred embodiment of the invention, it is to be understood that the excess lengths of the first pressure line portion 46a and the first discharge tube portion 52a permit the floating pressure vessel 44 to travel along the length of the chlorine storage container 40 as the chlorine solution level 42a changes in the storage container 40. In the preferred embodiment, the excess lengths are helical coils of flexible tubing, as for example vinyl tubing. In one embodiment, the pressure line is made of ⅜" vinyl tubing and the discharge tubing is made of ¼" vinyl tubing.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. A pressurized chlorination system for treating wastewater in an effluent tank having an aeration chamber and a contact chamber, the chlorination system comprising:
   a storage container for containing a supply of liquid chlorine therein;
   a pressure vessel within said storage container, said vessel having a valve at a lower end of the pressure vessel to permit the liquid chlorine in said storage container to enter said vessel;
   a forced air device;
   a conduit in fluid communication with said forced air device and having a first open end adapted to be in fluid communication with the aeration chamber;
   a pressure passageway providing fluid communication between said forced air device with said vessel; and
   a chlorine discharge line in fluid communication with said vessel and having a discharge end adapted to communicate with the contact chamber.

2. The system of claim 1, further comprising a controller assembly selectively communicating said forced air device with said vessel for discharging liquid chlorine and air from said vessel into the contact chamber.

3. The system of claim 2, wherein said controller assembly comprises a control valve positioned in said pressure passageway.

4. The system of claim 3, wherein said controller assembly further comprises a timer mechanism.

5. The system of claim 3, wherein said controller assembly further comprises a float switch adapted to be within the contact chamber.

6. The system of claim 2, wherein said vessel is a floating vessel adapted to float in the supply of liquid chlorine.

7. The system of claim 6, wherein said floating vessel includes a buoyancy ring arranged and designed to be positioned at a plurality of locations along a length of said vessel.

8. A pressurized chlorination system for treating wastewater in an effluent tank having an aeration chamber and a contact chamber, the chlorination system comprising:
   a storage container adapted to hold a supply of liquid chlorine;
   a pressure vessel within said storage container, said pressure vessel defining an interior volume and including a valve at a lower end of the pressure vessel, said valve providing a fluid communication path adapted to control the flow of liquid chlorine within said storage container to said interior volume of said pressure vessel;
   a forced air device;
   an air supply conduit in fluid communication with said forced air device and having an open end adapted to be in the aeration chamber;
   a pressure passageway providing fluid communication between said forced air device and said pressure vessel; and
   a chlorine discharge line in fluid communication with said interior volume of said pressure vessel and having a discharge end adapted to discharge chlorine in the contact chamber.

\* \* \* \* \*